United States Patent [19]
Oketani et al.

[11] Patent Number: 5,584,177
[45] Date of Patent: Dec. 17, 1996

[54] ADSORBER TEMPERATURE-ESTIMATING DEVICE FOR INTERNAL COMBUSTION ENGINES AND EXHAUST GAS-PURIFYING SYSTEM USING SAME

[75] Inventors: Toshikazu Oketani; Tetsu Teshirogi; Yuichi Shimasaki; Seiji Hatcho; Seiji Matsumoto; Takuya Aoki; Akihisa Saito; Takashi Komatsuda; Hiroaki Kato; Yukio Miyashita, all of Wako, Japan

[73] Assignee: Honda Giken Kogyo Kabushiki Kaisha, Tokyo, Japan

[21] Appl. No.: 365,006

[22] Filed: Dec. 28, 1994

[30] Foreign Application Priority Data

Dec. 28, 1993 [JP] Japan ..................... 5-351449

[51] Int. Cl.⁶ .......................................... F01N 3/28
[52] U.S. Cl. ................. 60/284; 60/277; 60/289; 60/297; 73/118.1
[58] Field of Search ............... 60/297, 277, 284, 60/289; 73/118.1

[56] References Cited

U.S. PATENT DOCUMENTS 5,158,063  10/1992  Hosoda ........................... 60/277

FOREIGN PATENT DOCUMENTS

5-149130  6/1993  Japan ........................ 60/279

*Primary Examiner*—Douglas Hart
*Attorney, Agent, or Firm*—Nikaido, Marmelstein, Murray & Oram LLP

[57] ABSTRACT

An adsorber temperature-estimating device for an internal combustion engine comprises an adsorber arranged in the exhaust passage, for adsorbing an unburnt gas component present in exhaust gases emitted from the engine. Operating parameter sensors detect operating parameters of the engine, and an ECU estimates the temperature of the adsorber, based on the detected operating parameters. An exhaust gas-purifying system for the engine comprises the adsorber, a catalytic converter arranged in the exhaust passage at a location downstream of the adsorbing means, for purifying exhaust gases, and a secondary air supply pump for supplying secondary air to the exhaust passage at a location upstream of the catalytic converter. The ECU controls an amount of secondary air to be supplied to the exhaust passage, based on the estimated temperature calculated by the adsorber temperature-estimating device.

12 Claims, 5 Drawing Sheets

ADSORBER TEMPERATURE-ESTIMATING DEVICE FOR INTERNAL COMBUSTION ENGINES AND EXHAUST GAS-PURIFYING SYSTEM USING SAME

BACKGROUND OF THE INVENTION

1. Field of the Invention

This invention relates to an adsorber temperature-estimating device for internal combustion engines, which estimates the temperature of an adsorber which is arranged in the exhaust system of the engine, for adsorbing an unburnt gas component present in exhaust gases, and also to an exhaust gas-purifying system for internal combustion engines, using the adsorber temperature-estimating device.

2. Prior Art

An exhaust gas-purifying system for internal combustion engines, which is equipped with an adsorber arranged in the exhaust system of the engine, for adsorbing an unburnt gas component (HC) contained in exhaust gases from the engine, has been conventionally proposed, for example, by Japanese Provisional Patent Publication (Kokai) No. 5-149130, wherein the temperature of an adsorbent accommodated in the adsorber is detected by a sensor, and the air-fuel ratio of exhaust gases or the amount of secondary air to be supplied to the exhaust system is controlled based on the detected temperature of the adsorbent as well as an output from an air-fuel ratio sensor arranged in the exhaust system, to thereby maximize the conversion efficiency of a catalytic converter arranged in the exhaust system and hence improve exhaust emission characteristics of the engine. Adsorbers of this kind including the one of the above proposed system, is used in the following manner: When the engine is in a cold condition such as at the start thereof, a large amount of unburnt exhaust component (HC) in exhaust gases is adsorbed and collected by the adsorber, while when the exhaust gas temperature rises subsequently, the HC is desorbed from the adsorber and delivered to the catalytic converter downstream of the adsorber, where the HC as well as CO and NOx in the exhaust gases are purified.

In the above proposed conventional system, however, since the temperature of the adsorbent or adsorber is detected by the sensor, the detected temperature unfavorably varies with a variation range of about ±25° C. due to variations in characteristics of the sensor. Besides, the use of the sensor forms a factor for an increased manufacturing cost of the system.

SUMMARY OF THE INVENTION

It is a first object of the invention to provide an adsorber temperature-estimating device for internal combustion engines, which is capable of accurately estimating the temperature of an adsorber arranged in the exhaust system of the engine.

It is a second object of the invention to provide an exhaust gas-purifying system for internal combustion engines, which is capable of controlling the amount of secondary air to be supplied to the exhaust system of the engine, in an appropriate manner based on the estimated temperature of the adsorber, to thereby maintain excellent exhaust emission characteristics of the engine.

To attain the first object, the present invention provides an adsorber temperature-estimating device for an internal combustion engine having an exhaust passage, and adsorbing means arranged in the exhaust passage, for adsorbing an unburnt gas component present in exhaust gases emitted from the engine, comprising:

operating parameter-detecting means for detecting operating parameters of the engine; and estimating means for estimating temperature of the adsorbing means, based on the operating parameters of the engine detected by the operating parameter-detecting means.

Preferably, the estimating means calculates an inflow heat quantity flowing into the adsorbing means per combustion cycle of the engine, and a radiation quantity radiated from the adsorbing means, based on the detected operating parameters of the engine, and calculates the estimated temperature of the adsorbing means, based on the inflow heat quantity and the radiation quantity calculated.

More preferably, the estimating means calculates the estimated temperature of the adsorbing means by converting a difference between the inflow heat quantity and the radiation quantity into a rate of variation in temperature of the adsorbing means, and adding the rate of variation obtained by the conversion to a preceding value of the estimated temperature.

Also preferably, the operating parameter-detecting means detects at least rotational speed of the engine and load on the engine, the estimating means determining the inflow heat quantity, based on the rotational speed of the engine and the load on the engine detected by the operating parameter-detecting means.

Preferably, the estimating means calculates the radiation quantity, based on the preceding value of the estimated temperature.

Further preferably, the estimating means corrects at least one of the inflow heat quantity and the radiation quantity, based on adsorption heat generated when the unburnt gas component present in the exhaust gases is adsorbed by the adsorbing means and desorption heat absorbed when the unburnt gas component present in the exhaust gases is desorbed from the adsorbing means.

To attain the second object, the present invention provides an exhaust gas-purifying system for an internal combustion engine having an exhaust passage, comprising:

adsorbing means arranged in the exhaust passage, for adsorbing an unburnt gas component present in exhaust gases emitted from the engine;

a catalytic converter arranged in the exhaust passage at a location downstream of the adsorbing means, for purifying exhaust gases;

secondary air-supply means for supplying secondary air to the exhaust passage at a location upstream of the catalytic converter; and an adsorber temperature-estimating device constructed as above;

the secondary air-supply means controlling an amount of secondary air to be supplied to the exhaust passage, based on estimated temperature of the adsorbing means calculated by the adsorber temperature-estimating device.

Preferably, the secondary air-supply means supplies the secondary air when the estimated temperature of the adsorbing means calculated by the adsorber temperature-estimating device falls within a range of a first predetermined value at and above which desorption of the unburnt gas component from the adsorbing means takes place to a second predetermined value at which the desorption terminates, the secondary air-supply means controlling the amount of the secondary air in relation to an amount of the unburnt gas component desorbed from the adsorbing means.

In a preferred embodiment of the invention, the secondary air-supply means supplies the secondary air to the exhaust passage at a location downstream of the adsorbing means.

In another preferred embodiment of the invention, the secondary air-supply means supplies the secondary air to the exhaust passage at a location upstream of the adsorbing means, and the exhaust gas-purifying system includes estimated temperature-correcting means for correcting the estimated temperature of the adsorbing means such that the estimated temperature is decreased as the amount of the secondary air increases.

The above and other objects, features, and advantages of the invention will be more apparent from the following detailed description taken in conjunction with the accompanying drawings.

DETAILED DESCRIPTION

The invention will now be described in detail with reference to the drawings showing an embodiment thereof.

Figure 1:
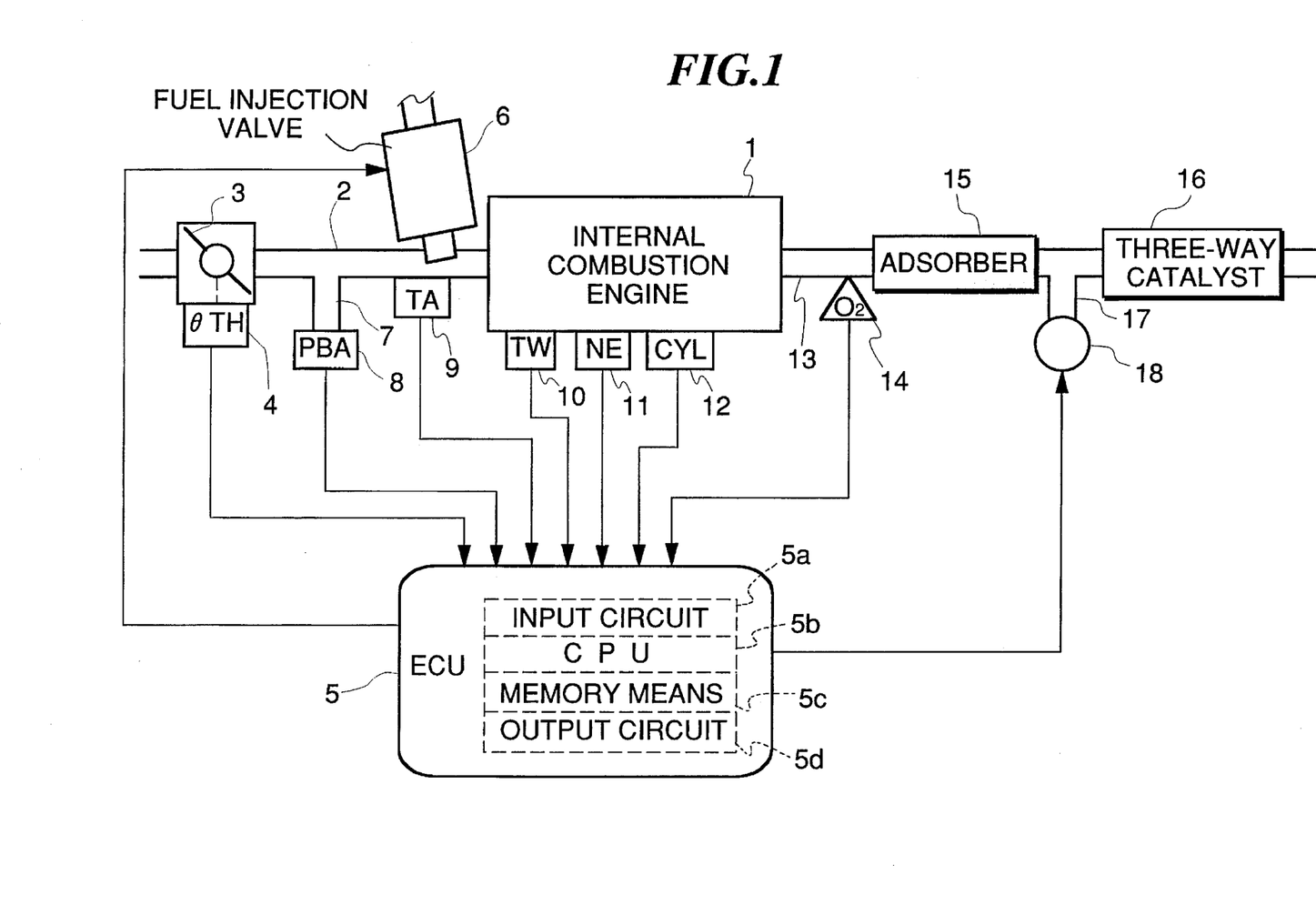
FIG. 1 is a schematic block diagram schematically showing the whole arrangement of an internal combustion engine and an adsorber temperature-estimating device as well as an exhaust gas-purifying system therefor, according to an embodiment of the invention.

Referring first to FIG. 1, there is shown the whole arrangement of an internal combustion engine and an adsorber temperature-estimating device as well as an exhaust gas-purifying system using the same, according to an embodiment of the invention.

In the figure, reference numeral 1 designates an internal combustion engine (hereinafter referred to as "the engine"), which is a four cylinder type, for example. In an intake pipe 2 of the engine 1, there is arranged a throttle valve 3. Connected to the throttle valve 3 is a throttle valve opening (θTH) sensor 4 for generating an electric signal indicative of the sensed throttle valve opening and supplying the same to an electronic control unit (hereinafter referred to as "the ECU") 5.

Fuel injection valves 6, only one of which is shown, are inserted into the intake pipe 2 at locations intermediate between the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

An intake pipe absolute pressure (PBA) sensor 8 is provided in communication with the interior of the intake pipe 2 via a conduit 7 opening into the intake pipe 2 at a location downstream of the throttle valve 3, for supplying an electric signal indicative of the sensed absolute pressure PBA within the intake pipe 2 to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine, for supplying an electric signal indicative of the sensed engine coolant temperature TW to the ECU 5.

An engine rotational speed (NE) sensor 11 and a cylinder-discriminating (CYL) sensor 12 are arranged in facing relation to a camshaft or a crankshaft of the engine 1, neither of which is shown. The NE sensor 11 generates a pulse as a TDC signal pulse at each of predetermined crank angles whenever the crankshaft rotates through 180 degrees, while the CYL sensor 12 generates a pulse as a CYL-discriminating signal pulse at a predetermined crank angle of a particular cylinder of the engine, both of the pulses being supplied to the ECU 5.

In an exhaust passage 13 extending from the cylinder block of the engine 1, there are serially arranged an oxygen concentration sensor (hereinafter referred to as "the 02 sensor") 14 as an air-fuel ratio sensor, an adsorber 15 for adsorbing an unburnt gas component (HC) present in exhaust gases, and a three-way catalyst 16 as a catalytic converter for purifying component elements, such as HC, CO and NOx, present in exhaust gases, in this order from the upstream side of the exhaust passage 13. The 02 sensor 14 detects the concentration of oxygen present in exhaust gases, and supplies an electric signal indicative of the sensed oxygen concentration to the ECU 5.

The adsorber 15 accommodates therein an adsorbent or a catalyst formed of zeolite or the like. The adsorber 15 acts to adsorb the unburnt gas component when the temperature of the device 15 is lower than a predetermined temperature, whereas it acts to desorb the unburnt gas component when the temperature thereof exceeds the predetermined temperature.

A secondary air supply pump 18 is connected to the exhaust passage 13 via a passage 17 opening into the exhaust passage 13 at a location downstream of the adsorber 15 and upstream of the three-way catalyst 16, the operation of which is controlled and driven by a signal from the ECU 5. By operating the pump 18, fresh air is supplied via the passage 17 into the exhaust passage 13, and the amount of air to be supplied is controlled by varying a duty ratio DUTY of the signal for driving the pump 18.

The ECU 5 is comprised of an input circuit 5a having the function of shaping the waveforms of input signals from various sensors mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed by the CPU 5b and various maps and tables, and for storing results of calculations therefrom, etc., and an output circuit 5d which outputs driving signals to the fuel injection valves 6, the secondary air supply pump 18, etc.

The CPU 5b operates in response to the abovementioned signals from the sensors to determine operating conditions in which the engine 1 is operating, such as an air-fuel ratio feedback control region in which air-fuel ratio control is carried out in response to oxygen concentration in exhaust gases, and open-loop control regions, and calculates, based upon the determined engine operating conditions, a valve opening period or fuel injection period TOUT over which the fuel injection valves 6 are to be opened, in synchronism with generation of TDC signal pulses, by the use of the following equation (1):

$$Tout = Ti \times KO2 \times K1 + K2 \quad (1)$$

where Ti represents a basic value of the fuel injection period Tout, which is determined according to the engine rotational speed NE and the intake pipe absolute pressure PBA, by the use of a Ti map, not shown, which is stored in the memory means 5c.

KO2 represents an air-fuel ratio correction coefficient calculated based on the output signal from the O2 sensor 14, which is set to such a value that the air-fuel ratio (oxygen concentration) detected by the O2 sensor 14 becomes equal to a desired value when the engine 1 is operating in the air-fuel ratio feedback control region, while it is set to predetermined values corresponding to the respective open-loop control regions of the engine 1 when the engine 1 is in the open-loop control regions.

K1 and K2 represent other correction coefficients and correction variables, respectively, which are set according to engine operating parameters to such values as optimize engine operating characteristics, such as fuel consumption and engine accelerability.

Further, the CPU 5b calculates an estimated value of the temperature of the adsorber 15, based on detected operating parameters of the engine, and calculates the duty ratio DUTY of the driving signal for the secondary air supply pump 18, based on the estimated temperature value.

The CPU 5b supplies driving signals via the output circuit 5d, to the fuel injection valves 6 and the pump 18, based on the Tout and DUTY values calculated as above.

Figure 2:
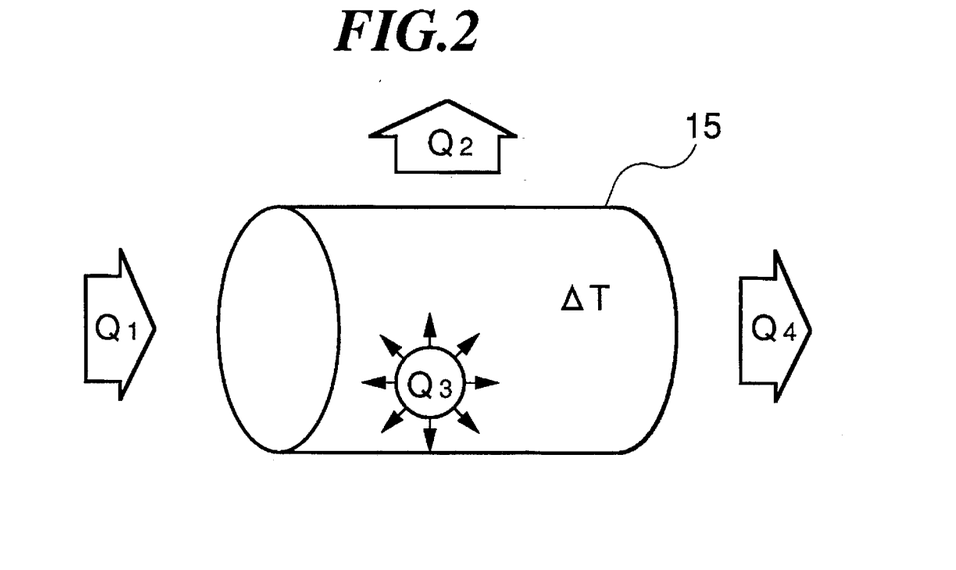
FIG. 2 is a schematic view useful in explaining how to estimate the temperature of an adsorber appearing in FIG. 1.

FIG. 2 shows how to estimate the temperature of the adsorber 15, according to the present embodiment. In the figure, symbol Q1 represents a heat quantity brought into the adsorber 15 by exhaust gases, Q2 a heat quantity (radiation quantity) radiated from the adsorber 15, Q3 a heat quantity generated by chemical reaction of the adsorbent in the adsorber 15, and Q4 a heat quantity emitted to the exhaust passage downstream of the adsorber 15. A heat quantity Q which contributes to a variation rate $\Delta T$ in the temperature of the adsorber 15 per combustion cycle of the engine 1 (each time interval of generation of TDC signal pulses) can be expressed based on the above-mentioned heat quantities Q1 to Q4, by the following equation (2):

$$Q = Q1 - Q2 + Q3 - Q4 \quad (2)$$

where the estimated temperature of the adsorber 15 is required only before chemical reaction takes place in the three-way catalyst 16, and therefore Q3 is set to 0.

An inflow heat quantity Y per combustion cycle depending on operating conditions of the engine 1 (heat quantity brought into the adsorber 15 due to exhaust gases flowing into the adsorber 15) is expressed by the following equation (3):

$$Y = Q1 - Q4 \quad (3)$$

Therefore, the variation rate $\Delta T$ in the temperature of the adsorber 15 is expressed by the following equation (4):

$$\Delta T = Q \times CJT = (Y - Q2) \times CJT \quad (4)$$

where CJT represents a constant for converting the heat quantity into the variation rate in the temperature of the adsorber 15, which is determined based on the specific heat and mass of the adsorber 15 and peripheral parts thereof. The CJT value can be empirically determined.

Thus, the estimated temperature NT of the adsorber 15 can be calculated by executing a calculation according to the following equation (5) every combustion cycle of the engine 1:

$$NT = NT + \Delta T = NT + (Y - Q2) \times CJT \quad (5)$$

where NT on the right side represents a value of the estimated temperature calculated in the last combustion cycle.

Then, description will be made of a manner of calculating the inflow heat quantity Y and the radiation quantity Q2.

Figure 3:
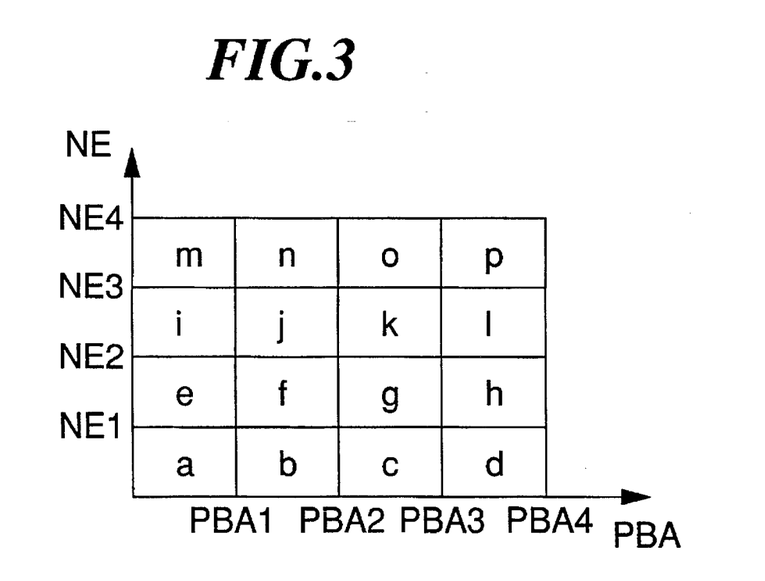
FIG. 3 shows a map for determining a heat quantity flowing into the adsorber.

The inflow heat quantity Y depends mainly on the engine rotational speed NE and the intake pipe absolute pressure PBA, and is considered to be further affected by the engine temperature and the outside air temperature. Therefore, the Y value can be expressed by the following equation (6):

$$Y = YMAP \times KTWC \times KTAC \quad (6)$$

where YMAP represents a basic heat quantity, which is read from a map shown in FIG. 3, wherein values $\underline{a}$ to $\underline{p}$ are set based on the NE and PBA values. The values $\underline{a}$ to $\underline{p}$ are set for respective regions which are determined by predetermined intake pipe absolute pressure values PBA1 to PBA4 and predetermined engine rotational speed values NE1 to NE4.

Figure 4A:
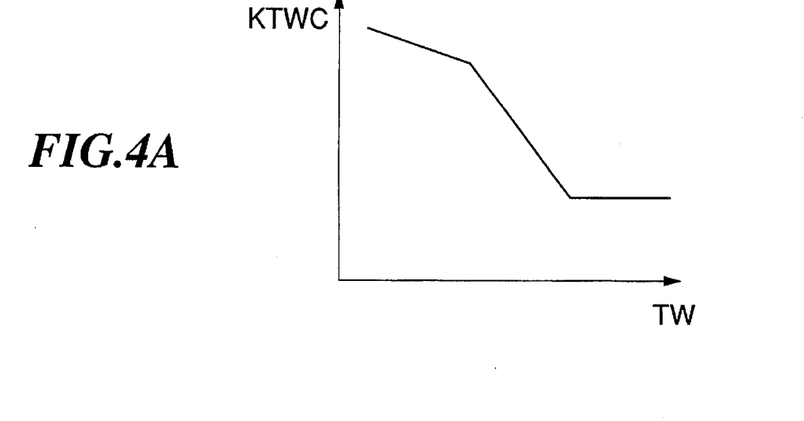
FIG. 4A shows a table for determining a correction coefficient KTWC.
Figure 4B:
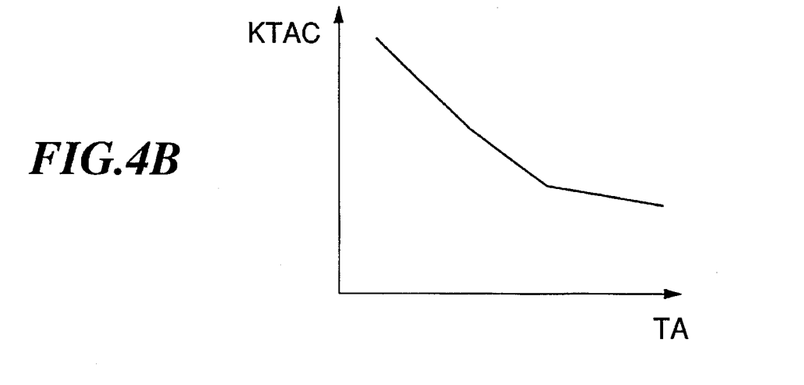
FIG. 4B shows a table for determining a correction coefficient KTAC.

KTWC represents a correction coefficient which is set according to the engine coolant temperature TW, as shown in FIG. 4A, while KTAC represents a correction coefficient which is set according to the intake air temperature TA, as shown in FIG. 4B.

Figure 4C:
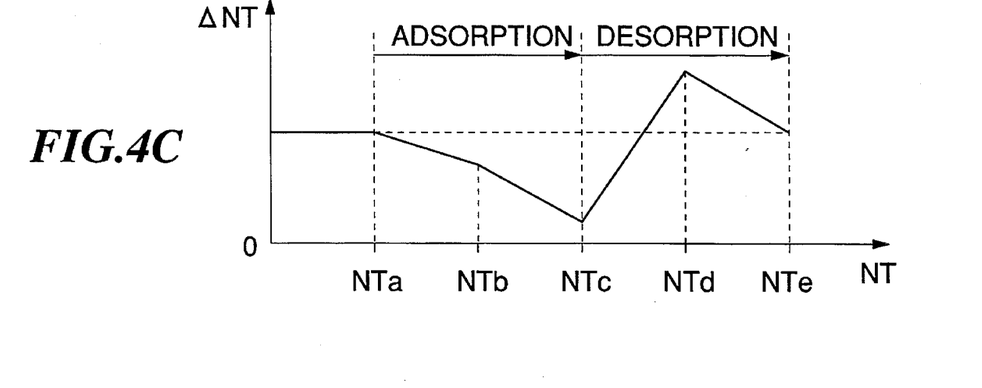
FIG. 4C shows a table for determining a radiation quantity ΔNT.

The radiation quantity Q2 is considered to depend mainly on the temperature of the adsorber 15 as well as the outside air temperature, and hence can be expressed by the following equation (7):

$$Q2 = \Delta NT \times KTAC \quad (7)$$

where $\Delta NT$ represents a radiation quantity per combustion cycle of the engine, which is set according to the estimated temperature NT, as shown in FIG. 4C.

In the figure, NTa to NTe represent predetermined estimated temperature values. When the temperature of the adsorber 15 falls within a range of the value NTa to the value NTc, an HC component present in exhaust gases is adsorbed by the adsorbent of the adsorber 15, whereby adsorption heat is generated, while the adsorber temperature falls within a range of the value NTc to the value NTe, the adsorbed HC component is desorbed from the adsorber 15, whereby desorption heat is absorbed, i.e. subtraction of desorption heat form the adsorber temperature takes place. Therefore, the radiation quantity Q2 is corrected such that it is decreased when adsorption heat is generated, while it is increased when subtraction of desorption heat takes place.

KTAC in the equation (7) represents the same correction coefficient as the correction coefficient KTAC in the equation (6).

By substituting the equations (6) and (7) into the equation (5), the following equation (8) is obtained for calculating the estimated temperature NT:

$$NT = NT + (YMAP \times KTWC \times KTAC - \Delta NT \times KTAC) \times CJT \quad (8)$$

The temperature of the adsorber 15 can be accurately estimated by executing a calculation according to the equation (8) in response to the engine operating parameters every combustion cycle.

Figure 5:
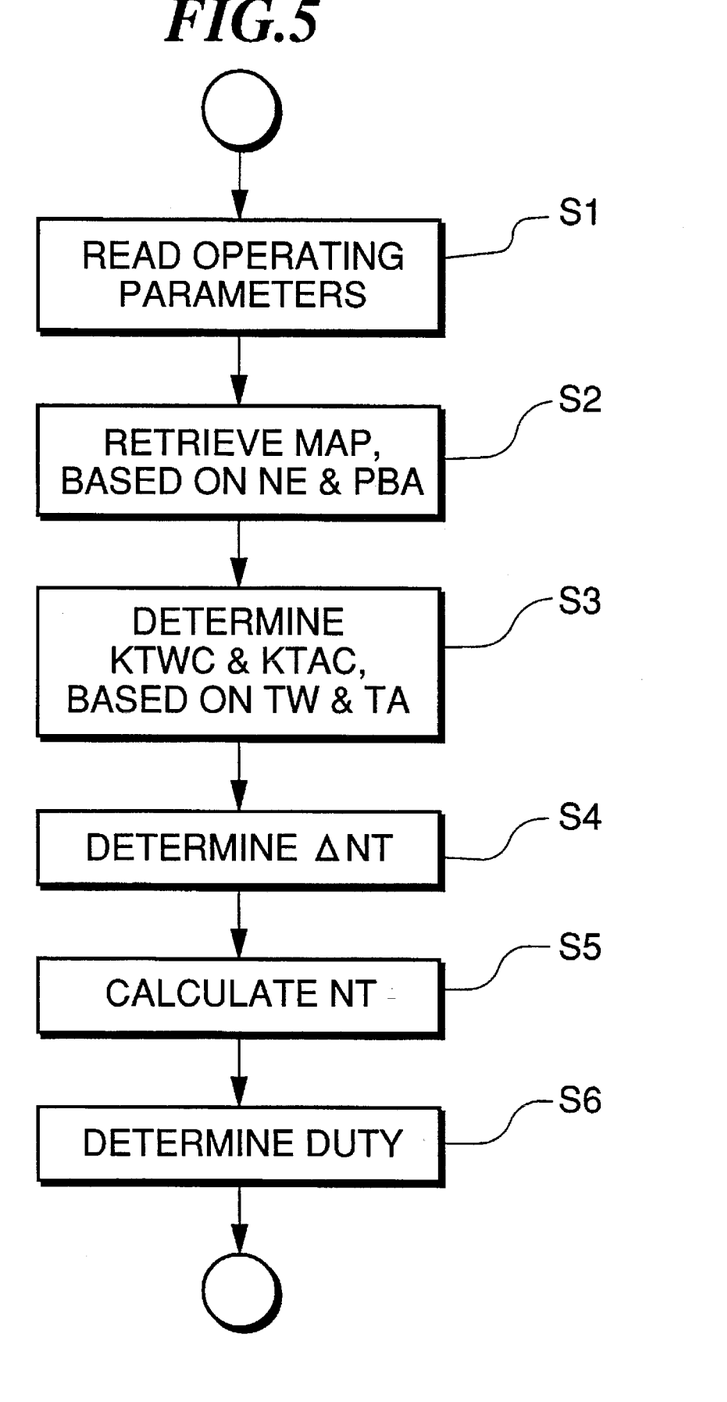
FIG. 5 is a flowchart showing a program for estimating the temperature of the adsorber and controlling the supply amount of secondary air.

FIG. 5 shows a program for calculating the estimated temperature NT and the duty ratio DUTY of the driving signal for the secondary air supply pump 18, which is executed by the CPU 5b. This program is executed in synchronism with generation of each TDC signal pulse.

At a step S1, engine operating parameters, such as the engine rotational speed NE and the intake pipe absolute pressure PBA, are read, and then at a step S2, the map of FIG. 3 is retrieved based on the read engine rotational speed NE and intake pipe absolute pressure PBA, to determine the basic heat quantity YMAP. At a step S3, the tables of FIGS. 4A and 4B are retrieved according to the read engine coolant temperature TW and intake air temperature TA, to determine the correction coefficients KTWC and KTAC.

At a step S4, the table of FIG. 4C is retrieved according to the estimated temperature NT calculated in the last combustion cycle, to determine the ΔNT value. At a step S5, the estimated temperature NT is calculated by the use of the aforesaid equation (8).

At a step S6, the duty ratio DUTY of the driving signal for the pump 18 is calculated based on the estimated temperature NT. Specifically, the DUTY value is determined by retrieving a table shown in FIG. 6, wherein the DUTY value is set according to the NT value.

Figure 6:
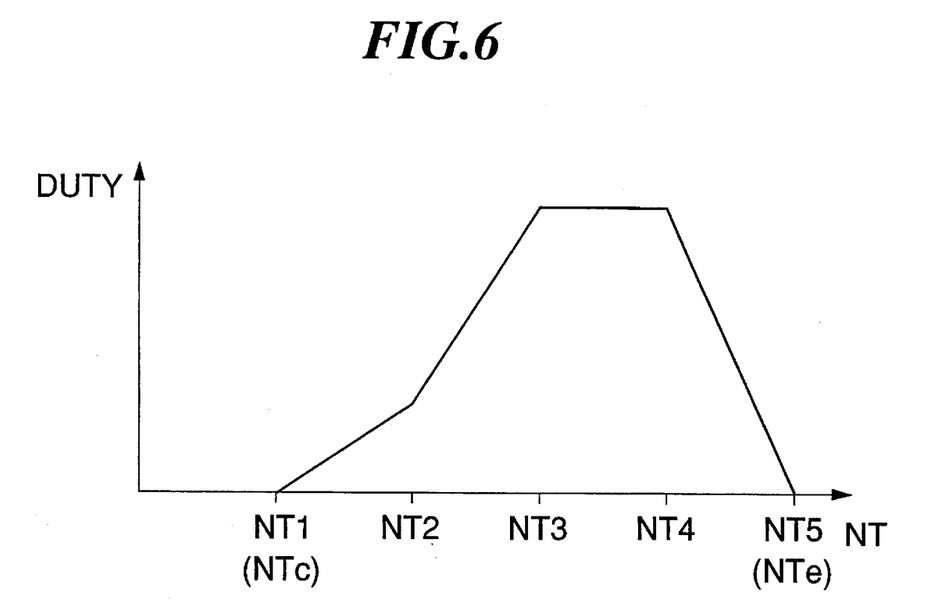
FIG. 6 shows a table for determining a duty ratio DUTY of a driving signal for driving a secondary air supply pump appearing in FIG. 1.

NT1 to NT5 in the table represent predetermined estimated temperature values, where the values NT1, NT5 are identical with the values NTc, NTe in the FIG. 4C table, respectively. More specifically, when the temperature of the adsorber 15 rises to the temperature NT1 (e.g. approximately 160° C.) at and above which desorption of the HC component takes place, the supply of secondary air is started, which is controlled in relation to the amount of desorption of the HC component. The supply of secondary air is continued until the adsorber 15 is heated to a desorption terminating temperature, i.e. the NT5=NTe value. The supply amount of secondary air is almost proportional to the DUTY value.

By supplying secondary air according to the estimated temperature NT in the above described manner, the conversion efficiency of the three-way catalyst 16 can be optimized, to thereby maintain excellent exhaust emission characteristics of the engine.

Although in the above described embodiment, the secondary air is supplied to the exhaust passage at a location downstream of the adsorber 15, this is not limitative, but it may be supplied to the exhaust passage at a location upstream of the adsorber 15. In this alternative arrangement, however, it is required that the estimated temperature NT should be corrected based on the supply amount of secondary air such that the NT value is decreased as the supply amount of secondary air increases.

Further, although in the above described embodiment, the radiation quantity ΔNT is corrected based on the adsorption heat and the desorption heat, however, alternatively the inflow heat quantity Y or both of the ΔNT and Y values may be corrected.

Still further, the aforesaid air fuel ratio correction coefficient KO2 may be corrected according to the estimated temperature NT.

What is claimed is:

1. An adsorber temperature-estimating device for an internal combustion engine having an exhaust passage, and adsorbing means arranged in said exhaust passage, for adsorbing an unburnt gas component present in exhaust gases emitted from said engine, comprising:

operating parameter-detecting means for detecting operating parameters of said engine; and estimating means for estimating temperature of said adsorbing means, based on said operating parameters of said engine detected by said operating parameter-detecting means, wherein said estimating means calculates an inflow heat quantity flowing into said adsorbing means per combustion cycle of said engine, and a radiation quantity radiated from said adsorbing means, based on said detected operating parameters of said engine, and calculates said estimated temperature of said adsorbing means, based on said inflow heat quantity and said radiation quantity calculated.

2. An adsorber temperature-estimating device as claimed in claim 1, wherein said estimating means calculates said estimated temperature of said adsorbing means by converting a difference between said inflow heat quantity and said radiation quantity into a rate of variation in temperature of said adsorbing means, and adding said rate of variation obtained by said conversion to a preceding value of said estimated temperature.

3. An adsorber temperature-estimating device as claimed in claim 1, wherein said operating parameter-detecting means detects at least rotational speed of said engine and load on said engine, said estimating means determining said inflow heat quantity, based on said rotational speed of said engine and said load on said engine detected by said operating parameter-detecting means.

4. An adsorber temperature-estimating device as claimed in claim 2, wherein said estimating means calculates said radiation quantity, based on said preceding value of said estimated temperature.

5. An adsorber temperature-estimating device as claimed in claim 4, wherein said estimating means corrects at least one of said inflow heat quantity and said radiation quantity, based on adsorption heat generated when said unburnt gas component present in said exhaust gases is adsorbed by said adsorbing means and desorption heat absorbed when said unburnt gas component present in said exhaust gases is desorbed from said adsorbing means.

6. An exhaust gas-purifying system for an internal combustion engine having an exhaust passage, comprising:

adsorbing means arranged in said exhaust passage, for adsorbing an unburnt gas component present in exhaust gases emitted from said engine;

a catalytic converter arranged in said exhaust passage at a location downstream of said adsorbing means, for purifying exhaust gases;

secondary air-supply means for supplying secondary air to said exhaust passage at a location upstream of said catalytic converter; and an adsorber temperature-estimating device as claimed in any of claims 1 or 2 to 5;

said secondary air-supply means controlling an amount of secondary air to be supplied to said exhaust passage, based on estimated temperature of said adsorbing means calculated by said adsorber temperature-estimating device.

7. An exhaust gas-purifying system as claimed in claim 6, wherein said secondary air-supply means supplies said secondary air when said estimated temperature of said adsorbing means calculated by said adsorber temperature-estimating device falls within a range of a first predetermined value at and above which desorption of said unburnt gas component from said adsorbing means takes place to a second predetermined value at which said desorption terminates, said secondary air-supply means controlling said amount of said secondary air in relation to an amount of said unburnt gas component desorbed from said adsorbing means.

8. An exhaust gas-purifying system as claimed in claim 7, wherein said secondary air-supply means supplies said secondary air to said exhaust passage at a location downstream of said adsorbing means.

9. An exhaust gas-purifying system as claimed in claim 7, wherein said secondary air-supply means supplies said secondary air to said exhaust passage at a location upstream of said adsorbing means.

10. An exhaust gas-purifying system as claimed in claim 9, including estimated temperature-correcting means for correcting said estimated temperature of said adsorbing means such that said estimated temperature is decreased as said amount of said secondary air increases. parameters of said engine; and estimating means for estimating temperature of said adsorbing means, based on said operating parameters of said engine detected by said operating parameter-detecting means, wherein said estimating means calculates an inflow heat quantity flowing into said adsorbing means per combustion cycle of said engine, and a radiation quantity radiated from said adsorbing means, based on said detected operating parameters of said engine, and calculates said estimated temperature of said adsorbing means, based on said inflow heat quantity and said radiation quantity calculated.

11. An adsorber temperature-estimating device as claimed in claim 3, wherein said operating parameter-detecting means detects temperatures of said engine and intake air, and said estimating means corrects said inflow heat quantity in response to the detected temperatures of said engine and intake air.

12. An adsorber temperature-estimating device as claimed in claim 3, wherein said operating parameter-detecting means detects a temperature of intake air, and said estimating means corrects said radiation quantity in response to the detected temperature of intake air.

* * * * *